(12) United States Patent  
Roberge

(10) Patent No.: US 7,624,942 B2
(45) Date of Patent: Dec. 1, 2009

(54) DECOUPLED DUCTING FOR TWIN-ENGINE REACTION ROTOR DRIVE

(75) Inventor: Gary D. Roberge, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 563 days.

(21) Appl. No.: 11/471,183

(22) Filed: Jun. 20, 2006

(65) Prior Publication Data

US 2007/0290099 A1   Dec. 20, 2007

(51) Int. Cl.
  *B64C 29/00*   (2006.01)
(52) U.S. Cl. .......................... 244/7 A; 244/62; D12/327
(58) Field of Classification Search ............... 244/7 A, 244/6, 8, 22, 7 R, 23 B, 12.5, 12.6, 45 A, 244/73 R, 62; D12/327
  See application file for complete search history.

(56) References Cited

U.S. PATENT DOCUMENTS

| | | | |
|---|---|---|---|
| 3,792,827 A | 2/1974 | Girard | |
| 5,454,530 A | 10/1995 | Rutherford et al. | |
| 7,014,142 B2* | 3/2006 | Barocela et al. | 244/7 R |
| 7,275,711 B1* | 10/2007 | Flanigan | 244/17.11 |
| 7,412,825 B2* | 8/2008 | Muylaert | 60/324 |

OTHER PUBLICATIONS

Official Search Report of the European Patent Office in counterpart foreign Application No. 07252470.5-2422 filed Jun. 18, 2007.
Office Action dated Oct. 22, 2008, from the European Patent Office in counterpart foreign Application No. 07 252 470.5, filed Jun. 18, 2007.

* cited by examiner

*Primary Examiner*—Michael Carone
*Assistant Examiner*—Benjamin P Lee
(74) *Attorney, Agent, or Firm*—Kinney & Lange, P.A.

(57) ABSTRACT

An engine system for an aircraft capable of operating in a helicopter-type flight mode and a fixed-wing flight mode and is capable of transitioning between those flight modes while in-flight includes first and second engines, and a ducting assembly. The ducting assembly includes a first exhaust subassembly in fluid communication with the first engine and a second exhaust subassembly in fluid communication with the second engine. The first exhaust subassembly permits fluid transfer substantially independent of fluid transfer within the second exhaust subassembly.

5 Claims, 4 Drawing Sheets

DECOUPLED DUCTING FOR TWIN-ENGINE REACTION ROTOR DRIVE

BACKGROUND OF THE INVENTION

The present invention relates to engine systems, and more particularly to engine systems for aircraft capable of both helicopter-type flight and fixed-wing flight.

Aircraft are known that enable both helicopter-type flight and fixed-wing flight. One example of such an aircraft is described in U.S. Pat. No. 5,454,530. The single-engine X-50 "Dragonfly" aircraft from The Boeing Company, Chicago, Ill., is similar to that described in U.S. Pat. No. 5,454,530. These aircraft are commonly referred to as canard rotor wing (CRW) vehicles.

CRW vehicles include a canard assembly and a reaction rotor. The reaction rotor is driven (i.e., rotated) for relatively low speed helicopter-type flight, which enables maneuvers such as vertical takeoffs and landings. The reaction rotor can be locked in place for higher speed wing-born (fixed-wing) flight, which enables substantially horizontal flight. The canard assembly provides lift that is critical during changeover between helicopter-type flight and fixed-wing flight, and vice-versa.

However, there are numerous challenges with existing designs. For instance, single-engine designs have limitations with regard to engine placement, maintenance accessibility, etc. Moreover, safety risks are associated with single engine designs, because an engine shutdown event generally has greater safety risks over aircraft having a second engine that can remain operational for partial or emergency flight.

Known twin-engine designs route engine exhaust flows through common (i.e., coupled) ducting, which presents operational problems. For instance, acoustic coupling of exhaust flows from the engines, which may arise from exhaust flow characteristics and/or minor irregularities (i.e., differences) between adjacent engines, can be communicated through common manifold ducting. Moreover, sudden-onset stall or surge events in one event cannot be adequately compensated for, and can have an undesirable adverse impact on the adjacent engine coupled through common ducting.

BRIEF SUMMARY OF THE INVENTION

An engine system according to the present invention for use with an aircraft capable of operating in a helicopter-type flight mode and a fixed-wing flight mode and is capable of transitioning between those flight modes while in-flight includes first and second engines and a ducting assembly. The ducting assembly includes a first exhaust subassembly in fluid communication with the first engine and a second exhaust subassembly in fluid communication with the second engine. The first exhaust subassembly permits fluid transfer substantially independent of fluid transfer within the second exhaust subassembly.

DETAILED DESCRIPTION

Figure 1:
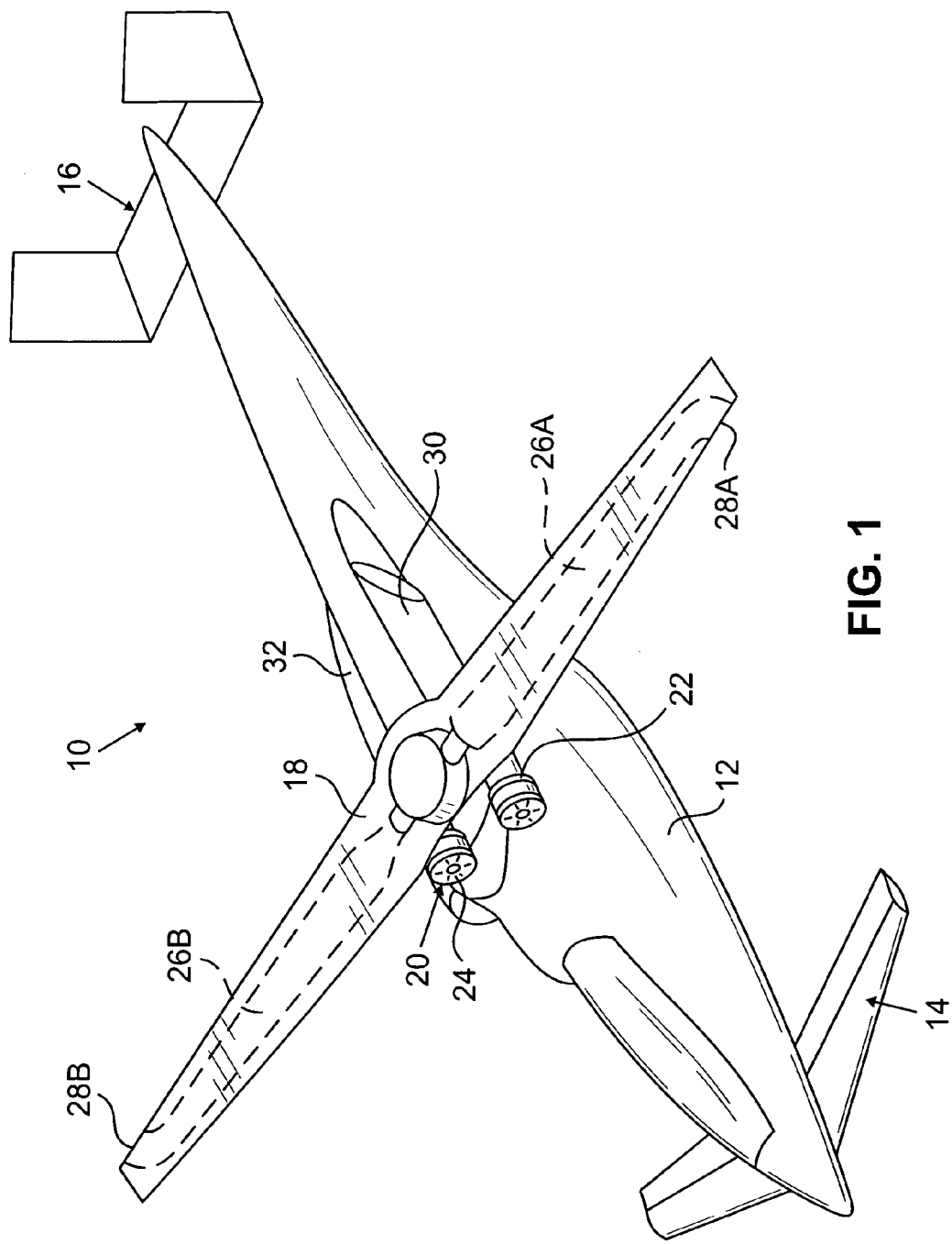
FIG. 1 is a perspective view of an aircraft having an engine system according to the present invention.

FIG. 1 is a perspective view of an aircraft 10 having a main airframe 12, a canard assembly 14, a tail assembly 16, a reaction rotor 18, and an engine system 20 that includes a first gas turbine engine 22 and a second gas turbine engine 24. The aircraft 10 is a canard rotor wing (CRW) type vehicle capable of operating in a helicopter-type flight mode and a fixed-wing flight mode. The reaction rotor 18 can be selectively rotated, for helicopter-type flight, or be rotationally locked, for fixed-wing flight. The reaction rotor 18 is aerodynamically shaped to produce desired lift in both flight modes. As shown in FIG. 1, the reaction rotor 18 is rotated to a suitable position to be rotationally locked for substantially horizontal fixed-wing flight.

The reaction rotor 18 has internal passageways 26A and 26B through which exhaust can selectively flow from the first and second engines 22 and 24 in a helicopter-type flight mode. The internal passageways 26A and 26B terminate in outlets 28A and 28B, respectively, located at or near opposite ends of the reaction rotor 18 and oriented in opposite forward/aft directions. Fluid (i.e., exhaust) can flow through the outlets 28A and 28B to produce a combined torsional load on the reaction rotor, which provides rotational power to drive (i.e., to rotate) the reaction rotor 18.

The engine system 20 further includes a first exhaust nozzle 30 operatively connected to the first engine 22 and a second exhaust nozzle 32 operatively connected to the second engine 24. Fluid (i.e., exhaust) from the first and second engines 22 and 24 can selectively flow through the first and second exhaust nozzles 30 and 32, respectively, in a fixed-wing flight mode.

The first and second engines 22 and 24 can be any type of suitable gas turbine engines. The particular size and configuration of the engines 22 and 24 will vary as desired according to the particular application. Typically, the first and second engines 22 and 24 will be substantially identical.

The two flight modes of the aircraft 10 can be understood as follows. Fluid from the first and second engines 22 and 24 can be selectively routed through either the internal passageways 26A and 26B of the reaction rotor 18 or through the first and second exhaust nozzles 30 and 32. In the helicopter-type flight mode, fluid is directed from the first and second engines 22 and 24 through the internal passageways 26A and 26B and to the outlets 28A and 28B, in order to drive the reaction rotor 18. Rotation of the reaction rotor 18 generates lift, and enables helicopter-type flight, including maneuvers such as vertical takeoffs and landings. In the fixed-wing flight mode, fluid is directed from the first and second engines 22 and 24 through the first and second exhaust nozzles 30 and 32, respectively, to produce thrust while lift is provided by the rotationally locked reaction rotor 18 (acting as a fixed wing).

A changeover procedure can be initiated while in flight to transition between the helicopter-type flight mode and the fixed-wing flight mode, or vice-versa. As desired by a pilot during flight, the reaction rotor 18 can be locked in place relative to the main airframe 12 to prevent rotation and enable fixed-wing flight. The canard assembly 14 provides lift that is useful during the changeover procedure. Further examples of CRW vehicle flight modes are described in U.S. Pat. No. 5,454,530.

Figure 2:
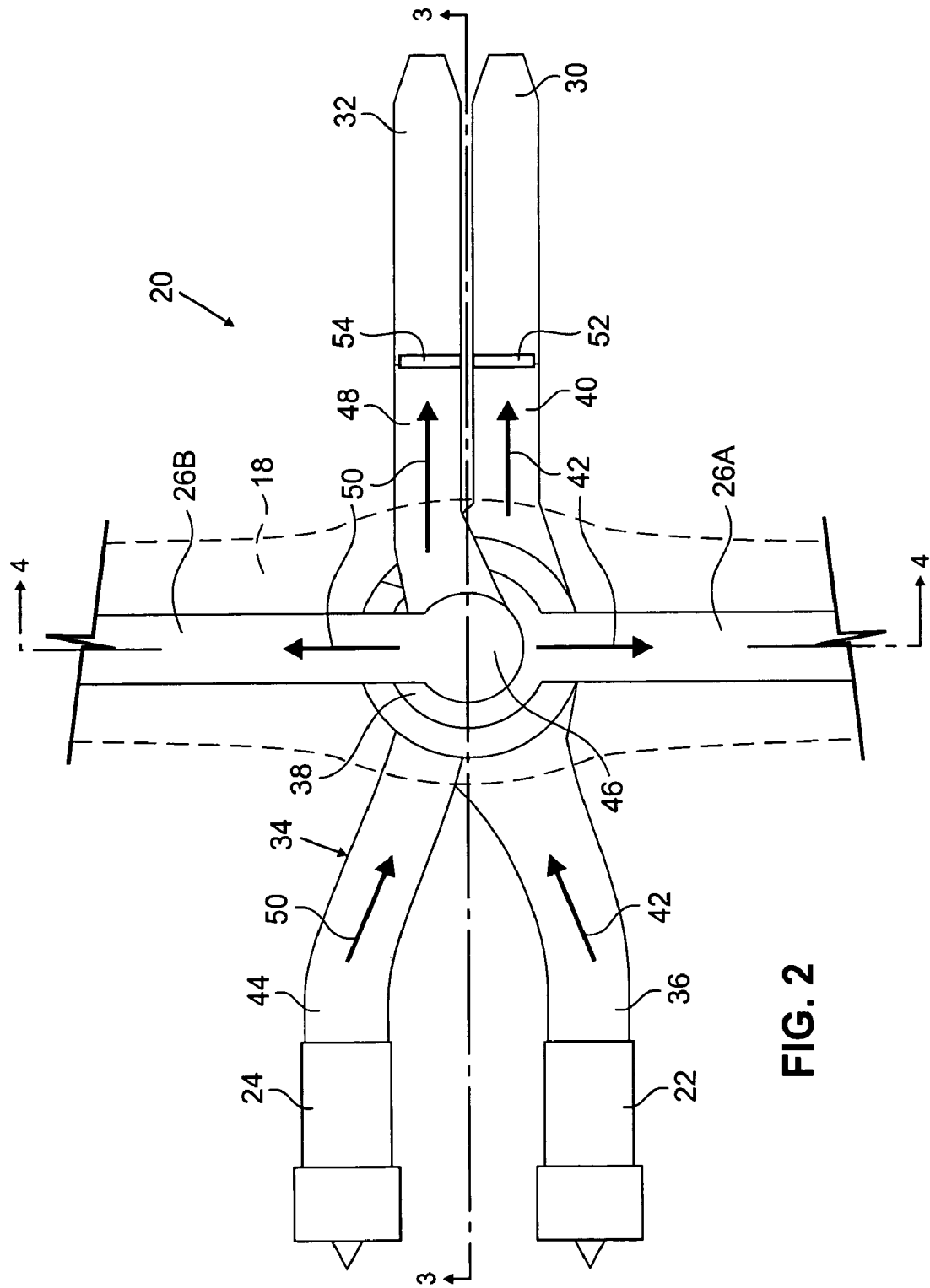
FIG. 2 is a schematic top view of the engine system.
Figure 3:
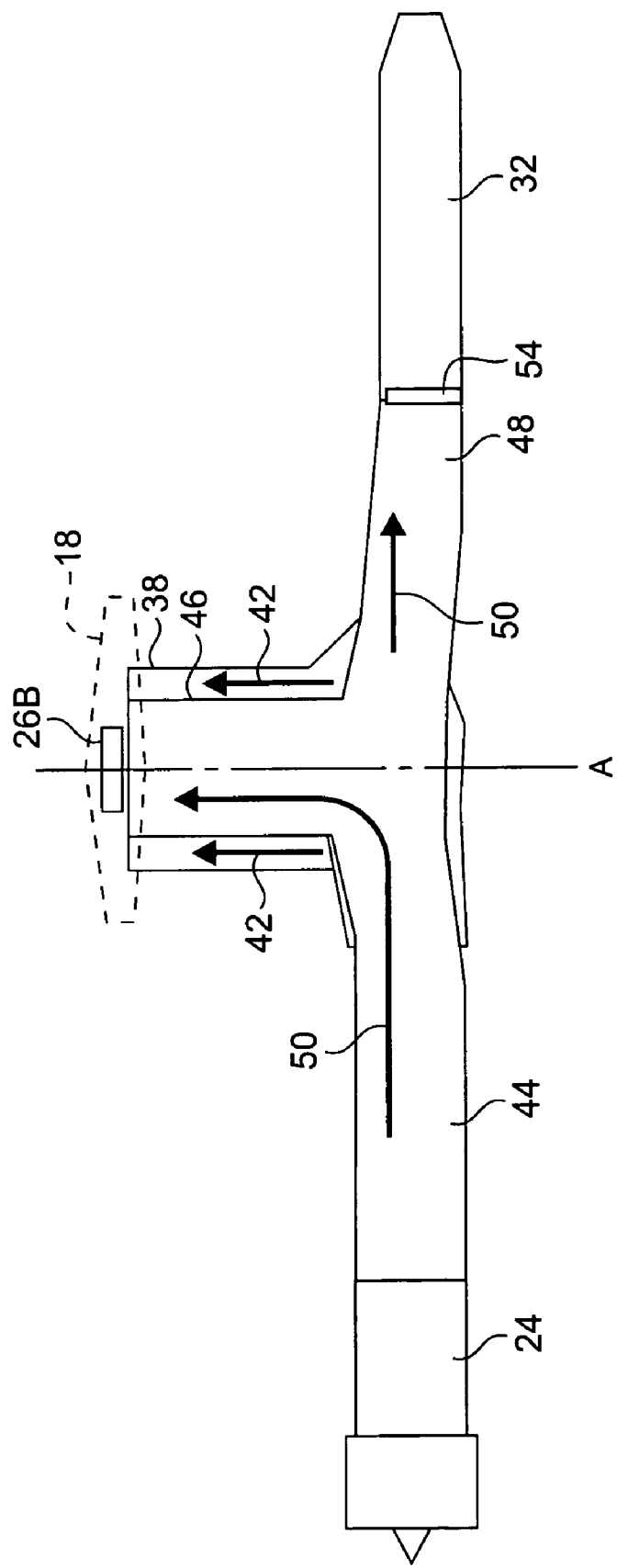
FIG. 3 is a schematic cross-sectional side view of the engine system, taken along line 3-3 of FIG. 2.

FIGS. 2 and 3 are schematic representations of the engine system 20. FIG. 2 is a schematic top view of the engine system 20, and FIG. 3 is a schematic cross-sectional side view of the engine system 20, taken along line 3-3 of FIG. 2. The reaction rotor 18 is shown in phantom for reference, but other portions of the aircraft 10 are omitted for clarity.

The engine system 20 includes a ducting assembly 34 that forms first and second decoupled ducting subassemblies. The first ducting subassembly serves the first engine 22 and includes an engine connection portion 36, a rotor connection portion 38 and a nozzle connection portion 40. The engine connection portion 36 is operably connected to the first engine 22. The rotor connection portion 38 is operably connected to the engine connection portion 36 and the passageway 26A of the reaction rotor 18. The nozzle connection portion 40 is operably connected to the first exhaust nozzle 30 and the rotor connection portion 38. A first flowpath 42 is defined from the first engine 22 through the engine connection portion 36, rotor connection portion 38 and nozzle connection portion 40. The second ducting subassembly serves the second engine 24 and includes an engine connection portion 44, a rotor connection portion 46 and a nozzle connection portion 48. The engine connection portion 44 is operably connected to the second engine 24. The rotor connection portion 46 is operably connected to the engine connection portion 44 and the passageway 26B of the reaction rotor 18. The nozzle connection portion 48 is operably connected to the second exhaust nozzle 32 and the rotor connection portion 46. A second flowpath 50 is defined from the second engine 24 through the engine connection portion 44, rotor connection portion 46 and nozzle connection portion 48.

As shown in FIG. 3, the rotor connection portions 38 and 46 of the first and second ducting subassemblies, respectively, are arranged concentrically about an axis A, which is the axis of rotation for the reaction rotor 18. In that way, the rotor connection portion 46 of the second ducting subassembly defines a generally cylindrical portion of the second flowpath 50, and the rotor connection portion 38 of the first ducting subassembly defines a generally annular portion of the first flowpath 42.

A first diverter valve 52 is located between the nozzle connection portion 40 of the first ducting subassembly and the first exhaust nozzle 30. A second diverter valve 54 is located between the nozzle connection portion 48 of the second ducting subassembly and the second exhaust nozzle 32. The first and second diverter valves 52 and 54 operate as selective on/off fluid flow blockers with regard to the first and second flowpaths 42 and 50, respectively. In one embodiment, the first and second diverter valves 52 and 54 are variable vane assemblies of a type with vanes that rotate like Venetian blinds to selectively permit or deny fluid flow to the respective first and second exhaust nozzles 30 and 32. Other types of diverter valves can be utilized in further embodiments.

The first and second diverter valves 52 and 54 are opened or closed based on the desired flight mode. When the first and second diverter valves 52 and 54 are closed, fluid flow to the first and second exhaust nozzles 30 and 32 is blocked (i.e., denied) and fluid flow is directed through the passageways 26A and 26B of the reaction rotor 18 and out of the outlets 28A and 28B—enabling helicopter-type flight. When the first and second diverter valves 52 and 54 are opened, primary fluid flow is through the first and second exhaust nozzles 30 and 32—enabling fixed-wing flight. It should be noted that when the first and second diverter valves 52 and 54 are opened there may be some fluid flow into the passageways 26A and 26B of the reaction rotor 18, but fluid will naturally tend to flow substantially through the first and second exhaust nozzles 30 and 32. However, in further embodiments, valves (not shown) can be used to selectively block fluid flow to the reaction rotor 18 for fixed-wing flight.

The first and second flowpaths 42 and 50 of the ducting assembly 34 are independent, because the first and second ducting subassemblies are decoupled. That is, fluid flows (i.e., exhaust) from the first and second engines 22 and 24 are independent and decoupled. This decoupling provides numerous advantages. For example, engine events relating to one engine do not affect fluid flows relative to the other engine, because the flowpath (or flow circuit) for each engine is self-contained and no flow interaction between the engines is anticipated. One engine can be shut down while the other engine can continue to operate without adverse fluid flow effects. The present invention further provides advantages in safety, survivability and installation packaging.

Figure 4:
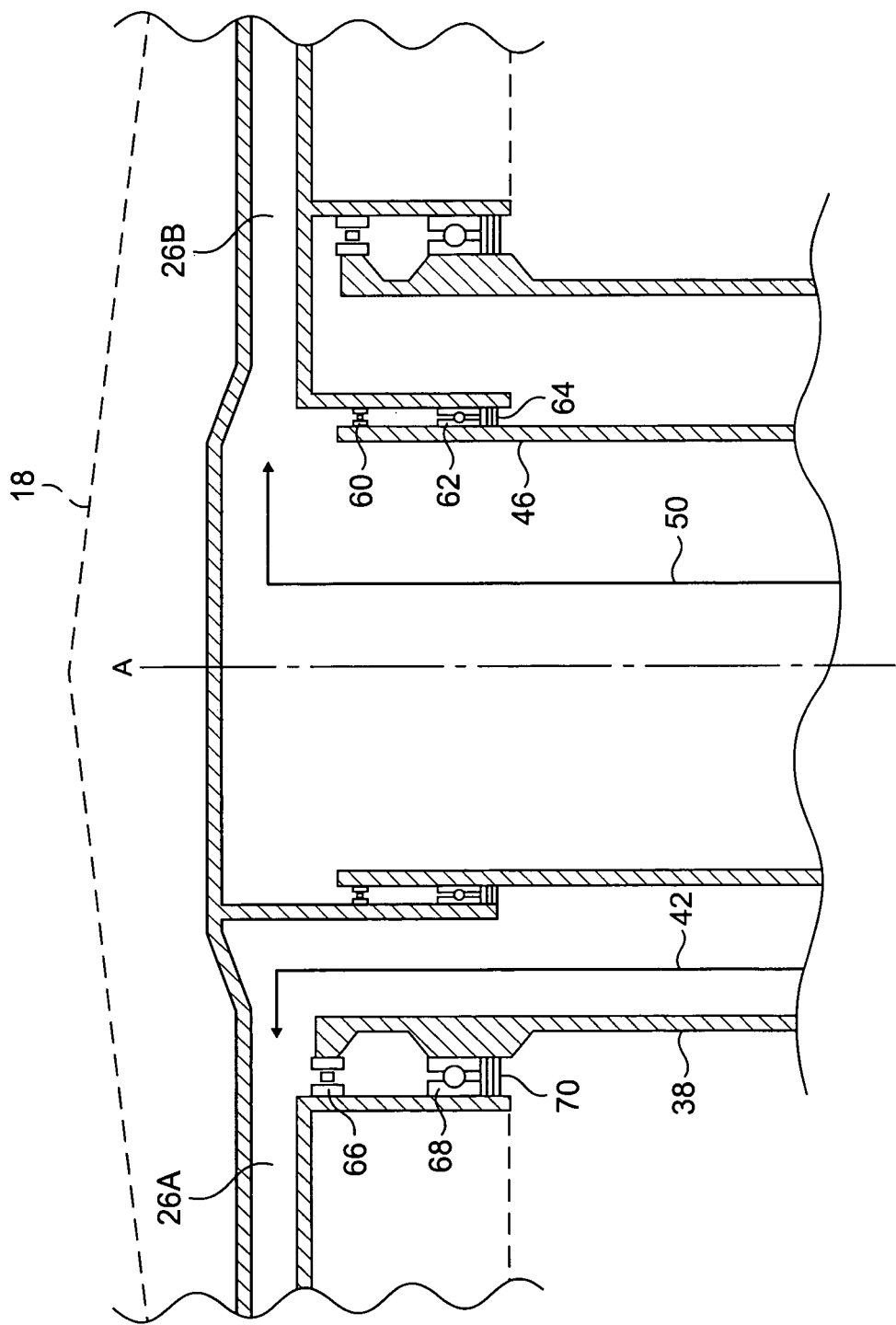
FIG. 4 is a cross-sectional view of a portion of the engine system, taken along line 4-4 of FIG. 2.

FIG. 4 is a cross-sectional view of a portion of the engine system 20, taken along line 4-4 of FIG. 2. As shown in FIG. 4, a first bearing set 60 and a second bearing set 62 support the rotor connection portion 46 of the second ducting subassembly relative to the reaction rotor 18 and the passageway 26B. The first bearing set 60 is a roller bearing set, and the second bearing set 62 is a ball bearing set (a thrust bearing set). A seal 64 is located adjacent to the second bearing set 62 to seal the second flowpath 50 relative to the first flowpath 42.

A third bearing set 66 and a fourth bearing set 68 support the rotor connection portion 38 of the first ducting subassembly relative to the reaction rotor 18 and the passageway 26A. The third bearing set 66 is a roller bearing set, and the fourth bearing set 68 is a ball bearing set (a thrust bearing set). A seal 70 is located adjacent to the fourth bearing set 68 to seal the first flowpath 42 relative to environmental air. The seals 64 and 70 can both be, for example, conventional brush seals or carbon seals.

It should be noted that the arrangement of the bearings and the interface between the rotating components of the ducting assembly 34 can vary as desired for a particular application. The particular embodiment shown in FIG. 4 is presented by way of example, and not by way of limitation.

Although the present invention has been described with reference to preferred embodiments, workers skilled in the art will recognize that changes may be made in form and detail without departing from the spirit and scope of the invention. For instance, the particular size, shape and arrangement of the flowpaths of the decoupled ducting can vary as desired, and two or more independent flowpaths can be created, depending on the number of engines utilized with a particular aircraft.

What is claimed is:

1. An engine system for an aircraft capable of both a helicopter-type flight mode and a fixed-wing flight mode and being able to transition between flight modes during flight, the engine system comprising:
   a first engine;
   a second engine;
   a reaction rotor having a first supply duct and a second supply duct extending therethrough in opposite directions;
   a first exhaust nozzle;
   a second exhaust nozzle;
   a first outlet located at or near a first end of the reaction rotor;
   a second outlet located at or near a second end of the reaction rotor, the second end located opposite the first end; and
   a flow transfer duct defining a first flow path and a separate second flow path, wherein the first flowpath of the flow transfer duct is in fluid communication with the first engine, the first supply duct of the reaction rotor, the first exhaust nozzle and the first outlet such that exhaust from the first engine is directed only through the first flow path to the first outlet at or near the first end of the reaction rotor in at least the helicopter-type flight mode, and wherein the second flowpath of the flow transfer duct is in fluid communication with the second engine, the second supply duct of the reaction rotor, the second exhaust nozzle and the second outlet such that exhaust from the second engine is directed only through the second flow path to the second outlet at or near the second end of the reaction rotor in at least the helicopter-type flight mode and such that the second flow path is independent from the first flow path.

2. The engine system of claim 1, wherein both the first engine and the second engine are gas turbine engines.

3. The engine system of claim 1, wherein at least portions of the first flow path and the second flow path are arranged concentrically.

4. The engine system of claim 3, wherein the concentric portion of second flow path is located inside the first flow path.

5. The engine system of claim 1 and further comprising:
a first diverter valve operable to permit closure of a portion of the first exhaust nozzle; and
a second diverter valve operable to permit closure of a portion of the second exhaust nozzle.

* * * * *